(12) United States Patent
Hipshier

(10) Patent No.: US 9,085,265 B2
(45) Date of Patent: Jul. 21, 2015

(54) FLEXIBLE INTERIOR TRIM COMPONENT HAVING AN INTEGRAL SKIN SHOW SURFACE

(75) Inventor: Jason M. Hipshier, Hudsonville, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/696,778

(22) PCT Filed: May 12, 2011

(86) PCT No.: PCT/US2011/036309
§ 371 (c)(1),
(2), (4) Date: Nov. 7, 2012

(87) PCT Pub. No.: WO2011/143467
PCT Pub. Date: Nov. 17, 2011

(65) Prior Publication Data
US 2013/0049389 A1  Feb. 28, 2013

Related U.S. Application Data

(60) Provisional application No. 61/334,067, filed on May 12, 2010.

(51) Int. Cl.
*B60R 7/04* (2006.01)
*B29C 44/08* (2006.01)
*B60R 13/02* (2006.01)
*B60R 11/00* (2006.01)

(52) U.S. Cl.
CPC ............. *B60R 7/04* (2013.01); *B29C 44/086* (2013.01); *B60R 13/0262* (2013.01); *B60R 2011/0094* (2013.01)

(58) Field of Classification Search
CPC ........ B60R 11/00; B60R 13/013; B60R 7/04; B60R 2011/0094
USPC ................. 296/152, 153, 37.8, 24.34, 190.11
See application file for complete search history.

(56) References Cited

U.S. PATENT DOCUMENTS

| 2,064,470 A | 12/1936 | Heckman |
| 2,573,962 A | 11/1951 | Fox et al. |
| 3,870,391 A | 3/1975 | Nims |

(Continued)

FOREIGN PATENT DOCUMENTS

| CN | 1672982 | 9/2005 |
| CN | 1898107 | 1/2007 |

(Continued)

OTHER PUBLICATIONS

PCT International Search Report and Written Opinion mailed Aug. 29, 2011.

(Continued)

*Primary Examiner* — Jason S Morrow
*Assistant Examiner* — E Turner Hicks
(74) *Attorney, Agent, or Firm* — Fletcher Yoder, P.C.

(57) ABSTRACT

An interior trim component is provided that includes substantially parallel ribs, and a cushion coupled to the substantially parallel ribs such that the interior trim component is capable of bending in a direction substantially perpendicular to an orientation of the substantially parallel ribs. The cushion includes an integral outer skin.

13 Claims, 7 Drawing Sheets

(56) References Cited

U.S. PATENT DOCUMENTS

| | | | |
|---|---|---|---|
| 4,157,845 | A | 6/1979 | Quéveau |
| 4,923,244 | A | 5/1990 | Clenet |
| 4,934,750 | A | 6/1990 | Eichler et al. |
| 5,169,699 | A | 12/1992 | Prince |
| 5,216,035 | A | 6/1993 | Harrison et al. |
| 5,266,234 | A | 11/1993 | Ho et al. |
| 5,389,693 | A | 2/1995 | DeGenova et al. |
| 5,752,740 | A | 5/1998 | Volkmann et al. |
| 6,217,112 | B1 | 4/2001 | Linsenmeier et al. |
| 6,231,940 | B1 | 5/2001 | Aichner et al. |
| 6,398,890 | B1 | 6/2002 | Spoerle |
| 6,499,785 | B2 * | 12/2002 | Eguchi ................... 296/37.8 |
| 6,558,497 | B2 | 5/2003 | Franco et al. |
| 6,602,579 | B2 * | 8/2003 | Landvik ................... 428/158 |
| 6,672,554 | B2 * | 1/2004 | Fukuo ................... 248/311.2 |
| 6,699,349 | B1 | 3/2004 | Spörle et al. |
| 6,845,032 | B2 | 1/2005 | Toyoda et al. |
| 6,883,852 | B2 | 4/2005 | Laskey |
| 6,953,612 | B2 | 10/2005 | Spoerle |
| 7,087,842 | B2 | 8/2006 | Belli et al. |
| 7,287,795 | B1 | 10/2007 | Thomas |
| 7,341,297 | B2 | 3/2008 | Nakamura et al. |
| 7,343,956 | B2 | 3/2008 | Schleef et al. |
| 7,475,954 | B1 | 1/2009 | Latunski |
| 7,581,773 | B2 | 9/2009 | Strasser et al. |
| 7,588,280 | B2 | 9/2009 | Dobos et al. |
| 7,591,499 | B2 | 9/2009 | Jonischkeit |
| 7,597,130 | B2 | 10/2009 | Ichimaru et al. |
| 7,735,538 | B2 | 6/2010 | Ogawa |
| 7,794,000 | B2 | 9/2010 | Ichimaru |
| 2001/0021438 | A1 | 9/2001 | Landvik |
| 2002/0005424 | A1* | 1/2002 | Lange et al. ................... 224/539 |
| 2003/0052129 | A1 | 3/2003 | Fukuo |
| 2004/0003890 | A1 | 1/2004 | Bauer et al. |
| 2004/0029030 | A1 | 2/2004 | Murray |
| 2004/0065456 | A1 | 4/2004 | Belli et al. |
| 2004/0118851 | A1 | 6/2004 | Shinomiya |
| 2004/0130174 | A1* | 7/2004 | Laskey ................... 296/37.1 |
| 2005/0098257 | A1 | 5/2005 | Bauer et al. |
| 2005/0194825 | A1 | 9/2005 | Kurz et al. |
| 2005/0252317 | A1* | 11/2005 | Ueki ................... 74/29 |
| 2005/0276874 | A1 | 12/2005 | Menaldo et al. |
| 2006/0037713 | A1* | 2/2006 | Ichimaru et al. ................... 160/37 |
| 2006/0066118 | A1 | 3/2006 | Radu et al. |
| 2006/0186696 | A1* | 8/2006 | Dobos et al. ................... 296/152 |
| 2006/0279106 | A1* | 12/2006 | Strasser et al. ................... 296/152 |
| 2007/0102463 | A1* | 5/2007 | Thomas ................... 224/275 |
| 2007/0125500 | A1 | 6/2007 | Gosling et al. |
| 2008/0084083 | A1 | 4/2008 | Boddie et al. |
| 2011/0272962 | A1* | 11/2011 | Bailey et al. ................... 296/153 |

FOREIGN PATENT DOCUMENTS

| | | | | |
|---|---|---|---|---|
| DE | 3807880 | | 9/1989 | |
| DE | 4010241 | | 4/1991 | |
| DE | 4220670 | | 1/1994 | |
| DE | 9403833 | | 5/1994 | |
| DE | 4309620 | | 9/1994 | |
| DE | 19524177 | | 8/1996 | |
| DE | 19646809 | | 5/1998 | |
| DE | 19654246 | | 6/1998 | |
| DE | 19822425 | | 2/2000 | |
| DE | 19909642 | | 4/2000 | |
| DE | 19923512 | | 12/2000 | |
| DE | 10023778 | | 11/2001 | |
| DE | 202004006649 | | 9/2004 | |
| DE | 102005006119 | | 8/2006 | |
| DE | 102008018557 | | 10/2009 | |
| DE | 102009057783 | | 6/2011 | |
| EP | 1600330 | | 11/2005 | |
| EP | 1690740 | | 8/2006 | |
| GB | 599652 | | 3/1948 | |
| WO | 2008064210 | | 5/2008 | |
| WO | WO 2008064210 | A2 * | 5/2008 | ................ B60R 7/04 |
| WO | 2011069682 | | 6/2011 | |

OTHER PUBLICATIONS

Japanese Office Action dated Nov. 5, 2013.
Chinese Office Action issued Jul. 1, 2014.
Gupta et al., "Formation of Integral Skin Polyurethane Forms," Jan. 1999, pp. 164-176, vol. 39, No. 1, Ploymer Engineering and Scnience.
European Patent Office Communication Pursuant to Article 94(3) EPC dated Mar. 24, 2014.
Chinese Office Action mailed Jan. 12, 2015.

* cited by examiner

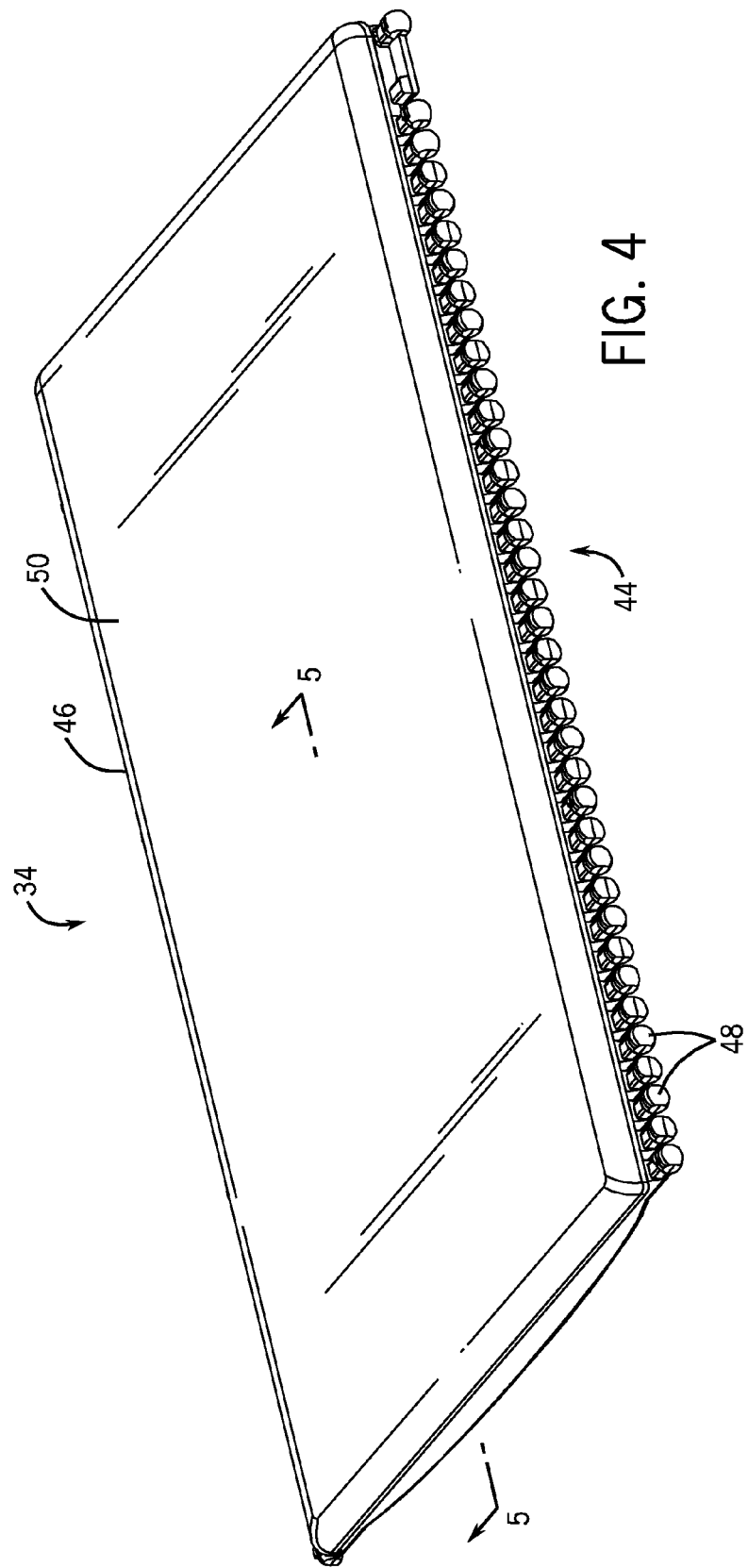

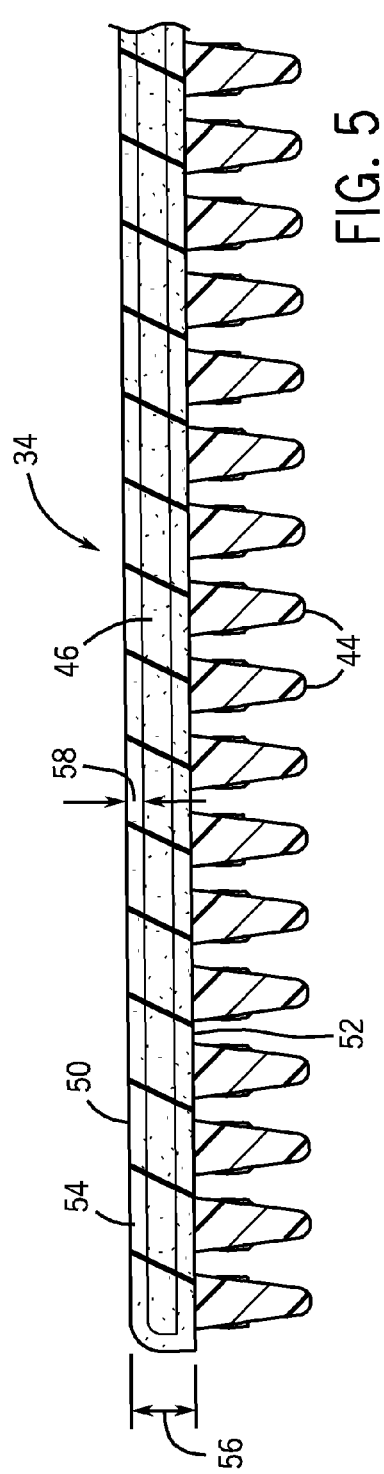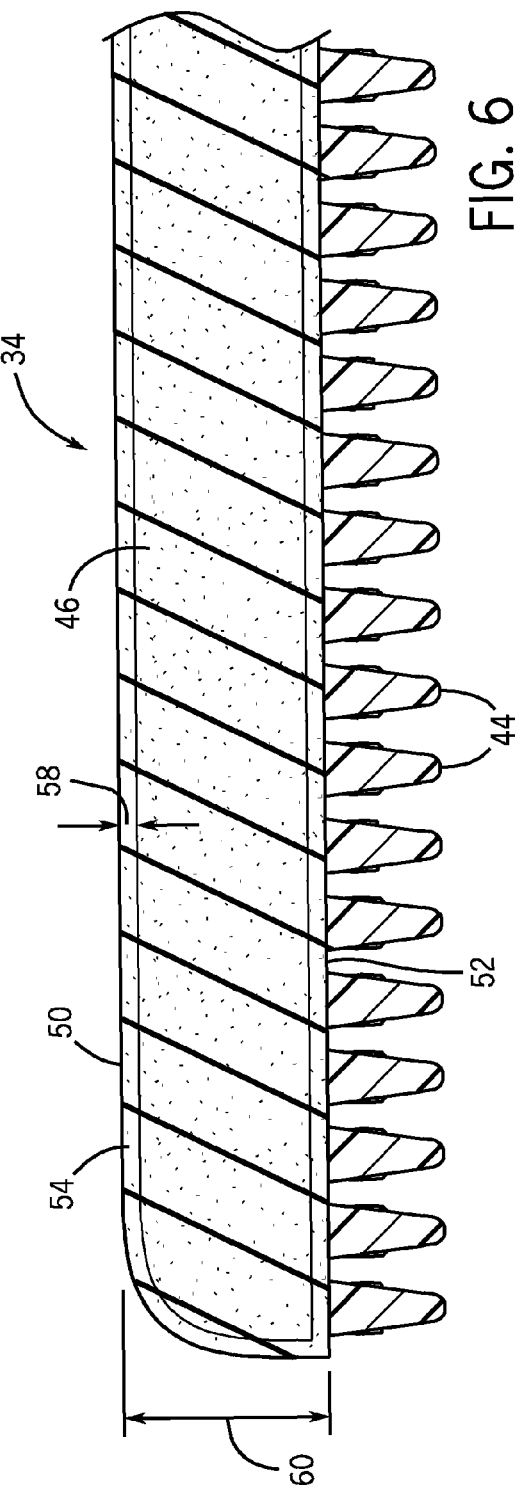

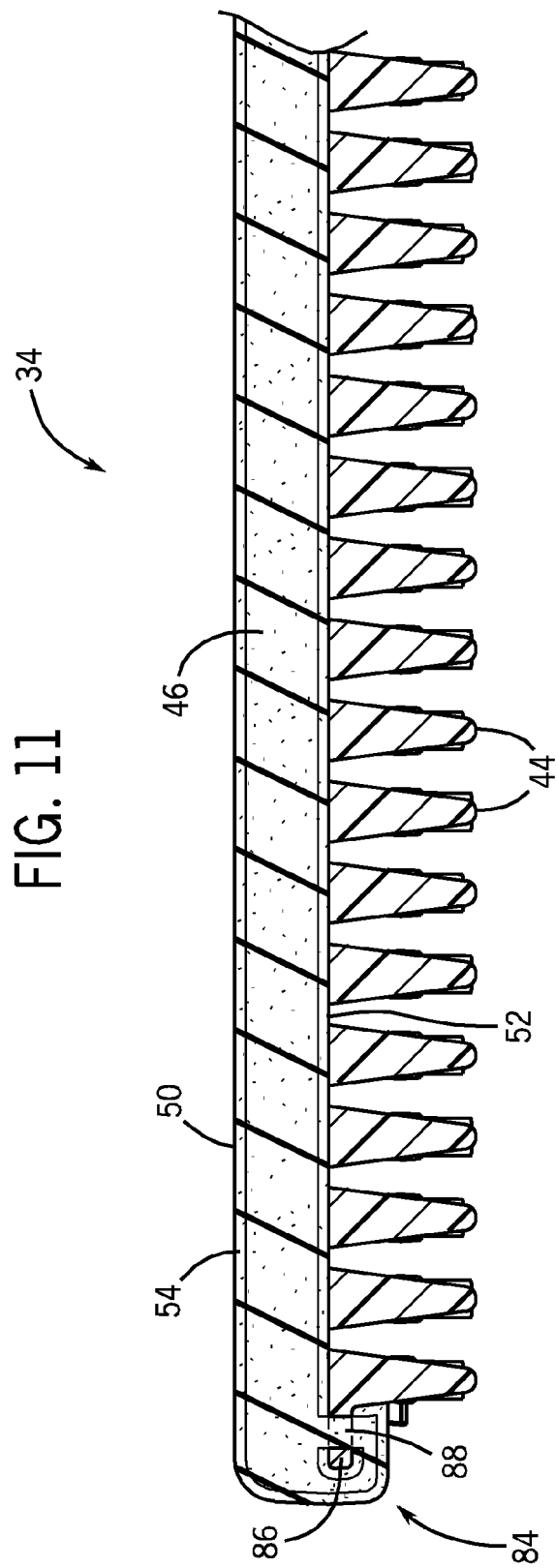

FLEXIBLE INTERIOR TRIM COMPONENT HAVING AN INTEGRAL SKIN SHOW SURFACE

CROSS REFERENCE TO RELATED APPLICATION

This application claims priority from and the benefit of U.S. Provisional Application Ser. No. 61/334,067, entitled "FLEXIBLE INTERIOR TRIM COMPONENT HAVING AN INTEGRAL SKIN SHOW SURFACE", filed May 12, 2010, which is hereby incorporated by reference in its entirety.

BACKGROUND

The invention relates generally to a flexible interior trim component for a vehicle, having an integral skin show surface.

Vehicle storage compartments may be positioned throughout an interior of a vehicle to store cargo and other small items. For example, an overhead console may include a storage compartment suitable for storing sunglasses, driving glasses, or other items. Other storage compartments may be located within a center console, an armrest, seats, door panels, or other areas of the vehicle interior. Certain storage compartments include a door configured to secure the contents of the compartment and/or hide the contents from view.

While a variety of door configurations may be employed, tambour doors are generally well-suited for storage compartments having curved openings. Typical tambour doors include a series of interlocked parallel ribs or segments that may rotate with respect to one another. In this manner, the tambour door may flex in a direction perpendicular to the orientation of the parallel segments. Such a configuration may enable the tambour door to match the contours of the curved storage compartment opening, thereby facilitating movement of the tambour door with respect to the storage compartment opening. Unfortunately, because the ribs are generally constructed from substantially rigid material, the show surface of the tambour door may be hard and/or stiff. In addition, recesses between the ribs may collect dirt and/or other contaminants, thereby degrading the appearance of the door. Alternatively, the ribs may be coupled to a flexible carrier configured to enable the tambour door to bend in a direction perpendicular to an orientation of the ribs. Unfortunately, because the flexible carrier is typically constructed from substantially hard material, the show surface of the tambour door may have an undesirable firmness and/or appearance.

BRIEF DESCRIPTION OF THE INVENTION

The present invention relates to an interior trim component including multiple substantially parallel ribs each configured to engage a track to facilitate movement of the interior trim component along the track. The interior trim component also includes a cushion having an integral outer skin. The cushion is coupled to the substantially parallel ribs, and the integral outer skin forms a show surface of the interior trim component.

The present invention also relates to an interior trim component including substantially parallel ribs, and a cushion coupled to the substantially parallel ribs such that the interior trim component is capable of bending in a direction substantially perpendicular to an orientation of the substantially parallel ribs. The cushion includes an integral outer skin.

The present invention further relates to a method of manufacturing an interior trim component including injecting resin into a first mold having multiple substantially parallel grooves to form corresponding substantially parallel ribs. The method also includes transferring the substantially parallel ribs to a second mold having a cavity opposite from the substantially parallel ribs, and pouring foam into the second mold such that the foam forms a cushion bonded to the substantially parallel ribs and having an integral outer skin.

DRAWINGS

FIG. 4 is a perspective view of an exemplary flexible door with an integral skin show surface that may be employed within the center console of FIG. 2.

FIG. 5 is a cross-sectional view of a first embodiment of the flexible door, taken along line 5-5 of FIG. 4.

FIG. 6 is a cross-sectional view of a second embodiment of the flexible door, having a thicker cushion.

FIG. 11 is a detailed cross-sectional view of an alternative embodiment of a flexible door.

DETAILED DESCRIPTION

Figure 1:
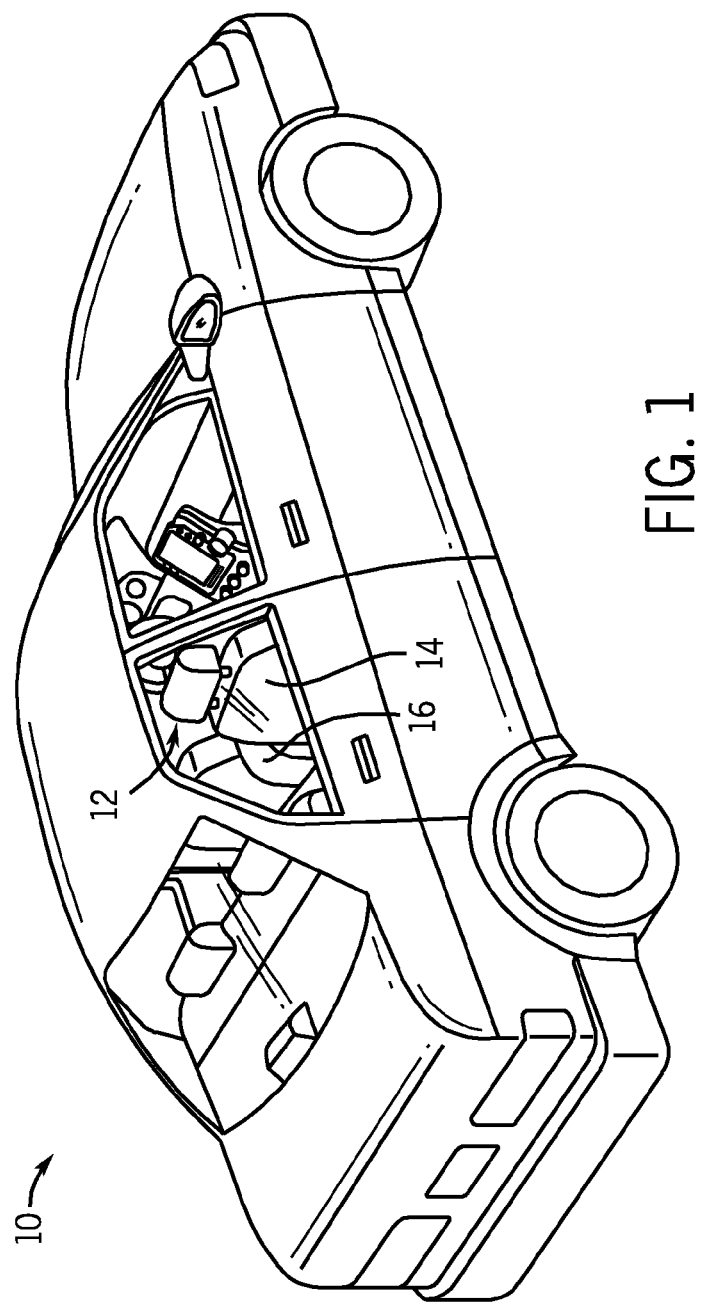
FIG. 1 is a perspective view of an exemplary vehicle that may include one or more storage compartments each having a flexible door with an integral skin show surface.

FIG. 1 is a perspective view of an exemplary vehicle 10, including an interior 12 having seats 14 and a center console 16. As discussed in detail below, the center console 16 and/or other areas within the interior 12 may include a flexible interior trim component having an integral skin show surface, such as a flexible door enclosing a storage compartment. For example, certain storage compartments may employ a flexible tambour door having multiple substantially parallel ribs. These ribs may be configured to engage a track, thereby facilitating movement of the tambour door along an opening of the storage compartment. The tambour door may also include a cushion having an interior surface facing an interior of the storage compartment, and an integral outer skin show surface facing the interior 12 of the vehicle 10. The interior surface may be coupled to the substantially parallel ribs such that the tambour door may flex in a direction perpendicular to the orientation of the substantially parallel ribs. Such a configuration may enable the tambour door to match the contours of a curved storage compartment opening, thereby facilitating movement of the tambour door with respect to the storage compartment opening. As discussed in detail below, the integral outer skin may be formed during the cushion molding process, and may serve to protect the cushion while providing a desired appearance.

As will be appreciated, typical tambour doors include a series of interlocked or otherwise joined parallel ribs or segments that may rotate with respect to one another. To facilitate tambour door segment rotation, a recess in the show surface may be positioned adjacent to each segment. These recesses may collect dirt and/or other contaminants, thereby degrading the appearance of the door. In addition, as the tambour door flexes, adjacent segments may rotate toward one another, thereby reducing the width of the intervening recesses. The decreasing width of the recesses may establish undesirable pinch points between adjacent segments. Furthermore, because the segments are generally constructed from substantially rigid material, the show surface of the tambour door may be hard and/or stiff. By providing a cushion having an integral outer skin, the present embodiments may eliminate these recesses and establish a soft show surface. As a result, any dirt or other contaminants which collect on the surface of the tambour door may be easily removed. In addition, the possibility of pinching between segments may be substantially reduced or eliminated. Furthermore, the cushioned show surface may enable the tambour door to serve as an armrest for vehicle occupants, thereby reducing the space utilized by a separate armrest and storage compartment door.

Figure 2:
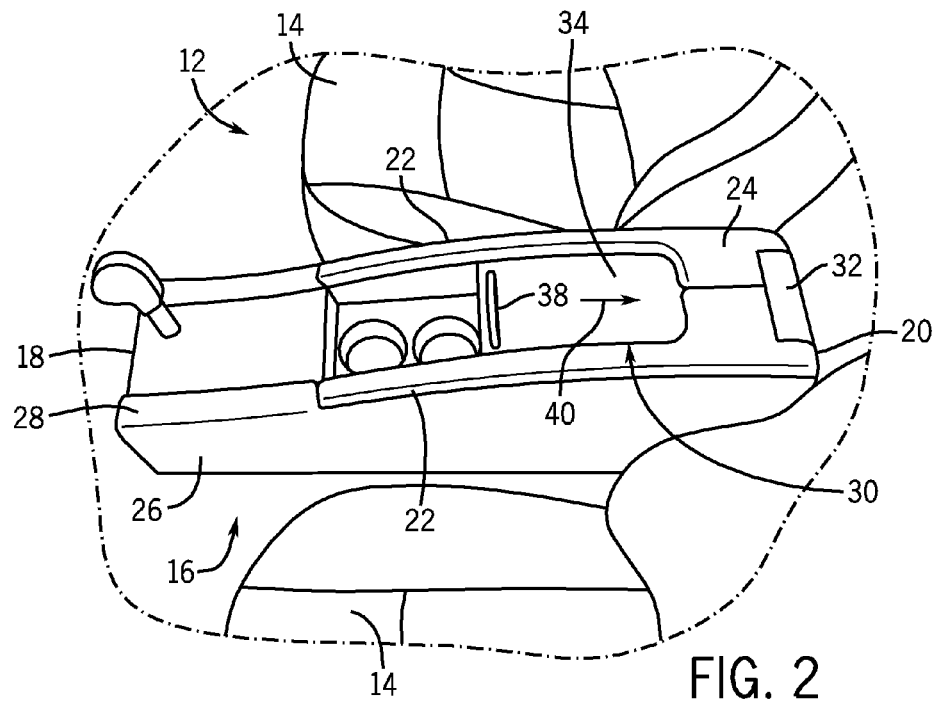
FIG. 2 is a perspective view of an exemplary center console that may be located within an interior of the vehicle of FIG. 1.

FIG. 2 is a perspective view of an exemplary center console 16 that may be located within an interior of the vehicle shown in FIG. 1. As discussed in detail below, the center console 16 may include a storage compartment enclosed by a flexible tambour door having an integral skin show surface. As illustrated, the console 16 is coupled to a floor of the vehicle interior 12 between a driver seat 14 and a passenger seat 14. In the present configuration, the console 16 is configured to provide a storage area and an armrest for an occupant of one or both seats 14. The console 16 is generally prismatic, having a front wall 18, a rear wall 20, two opposed and generally symmetrical side walls 22 and a top surface 24.

The console 16 also includes two side panels 26 which form the main body of the console 16. In the present configuration, each side panel 26 provides one of the side walls 22 of the console 16 and portions of the rear wall 20, the front wall 18 and the top surface 24. As illustrated, the side walls 22 include a compound-curved upper contour having both convex and concave portions, thereby transitioning between the raised rear wall 20 and the lower front wall 18. The top edges 28 of the side panels 26 form the curved top surface 24. The top surface 24 includes an opening 30 that enables an occupant to access an interior of the console 16. In certain configurations, the console 16 includes a rear panel 32 forming a portion of the rear wall 20 and/or the top surface 24.

In the present configuration, the console 16 includes a door 34 configured to transition between an open position and the illustrated closed position. The door 34 includes a handle 38 that enables an occupant to slide the door 34 between the two positions. As discussed in detail below, sliding the door 34 toward the open position in the direction 40 will expose an interior of a storage compartment located within the console 16. In certain configurations, the door 34 is a tambour door having a series of substantially parallel ribs coupled to a cushion. The ribs are configured to engage a track within the side walls 22, while the cushion enables the door 34 to flex and accommodate the contours of the opening 30. The cushion also enables the door 34 to serve as an armrest for the vehicle occupants, thereby reducing the space associated with providing a separate door 34 and armrest. In addition, the cushion includes an integral outer skin show surface to provide a desired appearance and to protect the cushion.

While the present tambour door is described with reference to the center console 16, it should be appreciated that alternative embodiments may employ similar tambour doors positioned throughout the interior 12 of the vehicle 10. For example, a storage compartment located within an overhead console, door panel, instrument panel, or other region of the interior 12 may include a flexible door having an integral skin show surface. Furthermore, other flexible interior trim components, in addition to the doors described above, may include similar parallel ribs and a cushion having an integral skin show surface. As discussed in detail below, the integral skin show surface may facilitate application of a decoration onto the interior trim component and/or accommodate various textures to enhance the appearance of the component.

Figure 3:
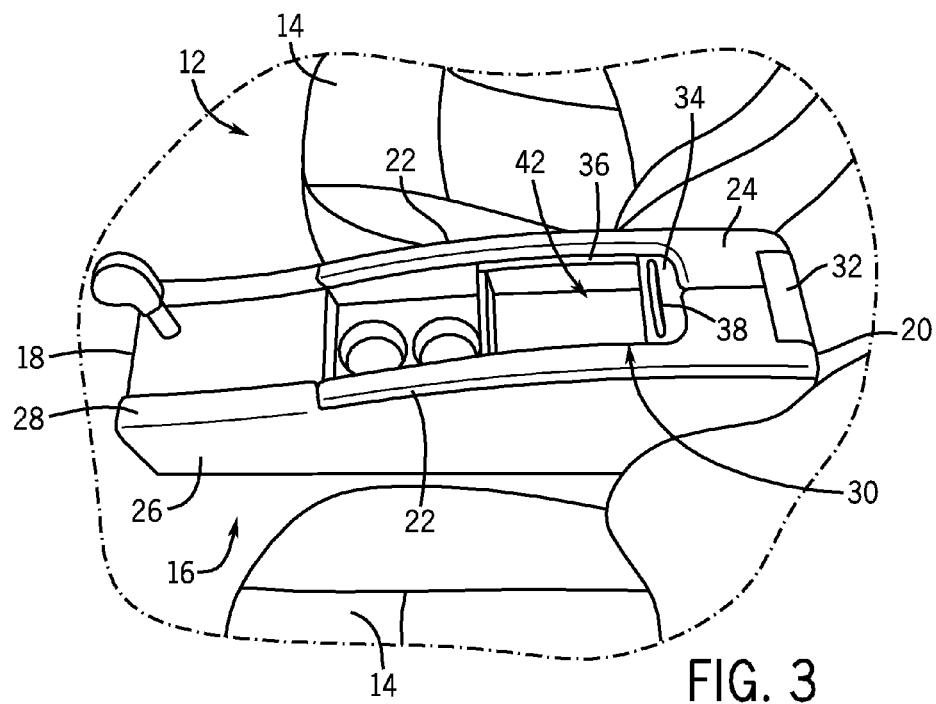
FIG. 3 is a perspective view of the center console of FIG. 2 with a flexible door in an open position.

FIG. 3 is a perspective view of the center console 16 of FIG. 2 with the flexible door 34 in an open position. As illustrated, the side walls 22 include rails or tracks 36 configured to facilitate movement of the door 34 in the direction 40. In certain configurations, the tracks 36 include a C-shaped cross section, and may be coupled to the side panels 26 or integrally formed within the side panels 26. As discussed in detail below, the substantially parallel ribs of the tambour door 34 include protrusions which engage the tracks 36 and support the door 34, while the attached integral skin cushion enables the door 34 to flex, thereby accommodating the contours of the opening 30. As illustrated, transitioning the door 34 to the open position exposes an interior 42 of the storage compartment within the center console 16.

As will be appreciated, a vehicle occupant may close the door 34 by grasping the handle 38 and moving the door 34 toward the front wall 18 of the center console 16. Because the surface of the door 34 facing the interior 12 of the vehicle 10 is formed by the integral outer skin of the cushion, the possibility of being pinched by segments of the door 34 may be substantially reduced or eliminated. Once in the closed position, the cushioned show surface of the door 34 may provide a suitable surface for an armrest and/or applying a decoration to the door 34 to enhance the appearance of the vehicle interior 12.

FIG. 4 is a perspective view of an exemplary flexible door with an integral skin show surface that may be employed within the center console of FIG. 2. As illustrated, the flexible door 34 includes multiple substantially parallel ribs 44 coupled to a padded substrate or cushion 46. The ribs 44 are configured to engage the tracks 36 of the console 16 to support the door 34 and to facilitate movement of the door 34 across the opening 30. In the illustrated embodiment, the ribs 44 include protrusions 48 configured to interlock with a corresponding recess within each track 36. As discussed in detail below, the ribs 44 are coupled to a surface of the cushion 46 facing the interior 42 of the console 16, thereby forming a unitary structure. In this configuration, the door 34 may flex in a direction perpendicular to the orientation of the substantially parallel ribs 44, thereby enabling the tambour door to match the contours of a curved storage compartment opening. Furthermore, the cushion 46 includes an integral outer skin that forms a show surface 50 and provides a smooth, consistent appearance to the outer surface of the flexible door 34.

As discussed in detail below, the ribs 44 may be formed by an injection molding process, and may therefore be composed of any suitable material for injection molding. For example, the ribs 44 may be composed of a thermoplastic polymer, such as polyamide, polycarbonate, or acrylonitrile butadiene styrene. It should be appreciated that the ribs 44 may be composed of other materials suitable for injection molding in alternative embodiments. In addition, the ribs 44 may include a chemical blowing agent and/or any other suitable additives.

In certain embodiments, the cushion 46 is formed by a molding process in which two reactive foam compounds are mixed and poured into an open mold having the desired shape of the cushion 46. The mold is then closed and the mixture is allowed to expand and cure. By placing the ribs 44 into the mold prior to pouring the foam, the foam will bond to the ribs 44 during the curing process. As a result, a unitary flexible component will be formed. Furthermore, material chemistry as well as temperature variations within the mold will induce a high density flexible outer skin to form on the outer surface of the low density foam cushion. The resulting cushion 46 will have a substantially smooth or textured integral outer skin, while providing sufficient flexibility to enable the tambour door 34 to accommodate the contours of the curved storage compartment opening 30. As discussed in detail below, a layer of paint may be applied to the mold before the foam compounds are injected. The paint bonds with the foam adjacent to the inner surface of the mold, thereby establishing a desired color of the flexible outer skin. For example, the color of the outer skin may be selected to match the color of a fabric seat covering.

As previously discussed, the flexible door 34 may include a handle configured to facilitate movement of the door 34 between the open and closed positions. The handle may be attached to the door 34 by fasteners (e.g., bolts, screws, etc.) or injection molded along with the ribs 44. In configurations in which the handle is formed by injection molding, the foam may be poured over the plastic handle to establish a consistent appearance, or poured around the handle to provide a firm gasping surface. As will be appreciated, alternative embodiments may employ other components (e.g., knobs, recesses, etc.) in place of the handle to control movement of the door 34. For example, certain embodiments may include a handle formed by establishing a depression or recess into the cushion 46.

In contrast to tambour door configurations having segmented show surfaces, the flexible door 34 of the present embodiments does not include separate segments that rotate relative to one another. Instead, the cushion 46 is flexible, allowing the ribs 44 to move relative to one another while maintaining a unitary visual appearance of the flexible door 34. In addition, the cushion 46 establishes a soft show surface 50, thereby enabling the tambour door 34 to serve as an armrest for vehicle occupants. The cushion 46 also substantially reduces or eliminates the recesses between segments that may cause pinching and collection of dirt and/or other debris. Furthermore, the integral outer skin of the cushion 46 may be suitable for application of a decorative layer that may enhance the visual appearance of the tambour door 34.

FIG. 5 is a cross-sectional view of a first embodiment of the flexible door, taken along line 5-5 of FIG. 4. As illustrated, the ribs 44 are coupled to a first surface 52 of the cushion 46 which faces the interior 42 of the console 16. As discussed in detail below, the ribs 44 may be formed by an injection molding process. As will be appreciated, injection molding involves injecting liquid resin into a mold to form a completed part. Once the ribs 44 have been formed, the ribs 44 may be placed into a mold having a cavity shaped to form the cushion 46. Foam may then be poured into the mold. As the foam expands and cures, the foam bonds to the ribs 44, thereby forming a unitary structure including the ribs 44 and the cushion 46. In addition, due to the material chemistry as well as temperature variations within the mold, a high density flexible outer skin 54 will be formed around the low density foam cushion 46. The integral outer skin 54 may serve to protect the foam cushion 46, while providing a desirable appearance to the tambour door 34.

A thickness 56 of the cushion 46 may be configured to facilitate bending of the door 34 in a direction substantially perpendicular to an orientation of the substantially parallel ribs 44, while establishing a cushioned surface suitable for use as a vehicle armrest. As will be appreciated, thicker cushions 46 may provide an armrest with enhanced comfort, while thinner cushions 46 facilitate additional flexibility. For example, in certain embodiments, the thickness 56 may be greater than approximately 5 mm. By way of example, the thickness 56 may be approximately between 5 to 15, 6 to 13, 7 to 11, or about 9 mm. In addition, a thickness 58 of the integral outer skin 54 may be particularly selected to enable the skin to flex as the cushion 46 is compressed. For example, the thickness of the integral outer skin 54 may be less than approximately 2, 1.5, 1, 0.5, 0.3, 0.2, or 0.1 mm, or less.

In certain embodiments, the cavity which forms the cushion 46 may have a substantially smooth surface, thereby establishing a substantially smooth show surface 50 of the integral outer skin 54. As will be appreciated, smoothness may be defined by dimensional variations within the show surface 50 of the cushion 46. For example, dimensional variations within the show surface 50 may be between approximately 0.5 to 0.01, 0.3 to 0.03, 0.2 to 0.05, or about 0.1 mm. By further example, dimensional surface variations may be less than approximately 0.5, 0.3, 0.2, 0.1, 0.05, 0.03, or about 0.01 mm. Such a smooth surface 50 may enhance the appearance of the vehicle interior 12 and/or facilitate application of a decoration. In alternative embodiments, the cavity which forms the cushion 46 may have a textured surface, thereby establishing a textured show surface 50 of the integral outer skin 54. In further embodiments, the integral outer skin 54 may simulate the appearance of a tambour door having a series of interlocked parallel segments. For example, the cavity which forms the cushion 46 may have a series of parallel ridges that form corresponding parallel recesses in the integral outer skin 54. Such a configuration may provide the appearance of a segmented tambour door without creating the undesirable pinch points between segments.

In certain embodiments, the tambour door 34 may include a decorative layer disposed onto the show surface 50 of the integral outer skin 54, and a top coat layer disposed onto the decorative layer and bonded to the outer skin 54. The top coat layer is configured to flex with the outer skin 54 while substantially maintaining continuity across the show surface 50. For example, the integral outer skin 54 may simulate the appearance of a fabric skin by employing a surface finish that looks like a fabric pattern in conjunction with a textured outer skin. Such a configuration may increase the visual appeal of the tambour door 34, while reducing manufacturing costs compared to employing a separate skin.

FIG. 6 is a cross-sectional view of a second embodiment of the flexible door 34, having a thicker cushion 46. As previously discussed, the thicker cushion 46 may provide enhanced passenger comfort in configurations in which the tambour door 34 is used as an armrest. However, the thicker cushion 46 may reduce flexibility. Therefore, the illustrated tambour door 34 may be utilized in consoles 16 in which the tambour door 34 moves along a flat surface or along a surface having a large radius of curvature. For example, in certain embodiments, a thickness 60 of the cushion 46 may be greater than approximately 16 mm. By way of example, the thickness 60 may be approximately between 10 to 20, 12 to 18, 14 to 16, or about 15 mm.

Figure 7:
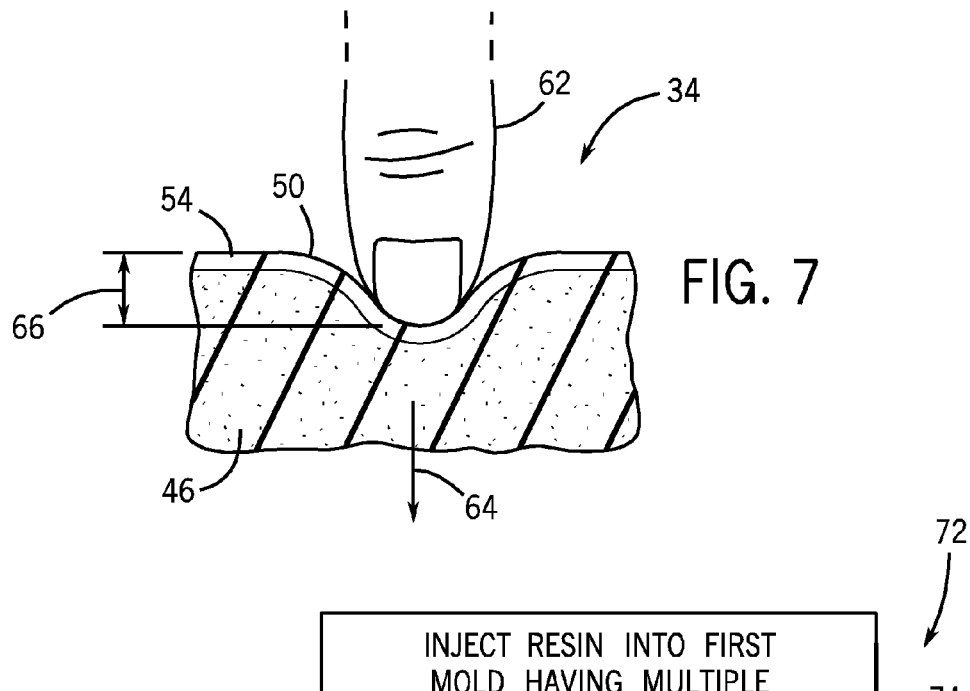
FIG. 7 is a detailed cross-sectional view of the flexible door, illustrating compression of the cushion and corresponding flexure of the integral outer skin.

FIG. 7 is a detailed cross-sectional view of the flexible door 34, illustrating compression of the cushion 46 and corresponding flexure of the integral outer skin 54. As previously discussed, the cushion 46 is disposed adjacent to the hard ribs 44, and configured to deform under a load. Consequently, if the tambour door 34 is used as an armrest within the vehicle interior 12, the weight of an occupant arm will be distributed across a large area of the door 34 as the cushion 46 deforms, thereby increasing occupant comfort. The integral outer skin 54 is configured to flex as the cushion 46 deforms, thereby protecting the cushion 46 and providing a desired appearance.

As will be appreciated, softness of the cushion 46 may be measured by determining the resistance of the cushion to deformation. A variety of tests may be employed to determine the resistance to deformation of the cushion. For example, one known indentation force deflection (IFD) test measures the force sufficient to indent a 50 square inch cushion section by a fraction (e.g., 25%) of its thickness. Based on the 25% IFD test, soft materials may have a range of approximately between 6 to 24 pounds, intermediate materials may have a range of approximately between 24 to 36 pounds, and hard materials may have a range of approximately between 36 to 45 pounds. In certain embodiments, the cushion 46 may be composed of a material having a 25% IFD of approximately between 24 to 36 pounds. Such a softness range may provide a desired level of passenger comfort. However, it should be appreciated that alternative embodiments may employ cushions having a higher or lower softness to achieve the desired properties of the soft component.

In addition, the integral outer skin 54 may provide durability, while maintaining flexibility. As will be appreciated, flexibility and durability of the integral outer skin 54 may be measured by determining the hardness of the constituent material. One measure of hardness is the resistance to indentation, otherwise referred to as Durometer, denoted in the Shore A scale, for example. Within the Durometer scale, materials are generally characterized based on ranges. Hard or rigid elastomers generally include those having a Durometer greater than about 90 Shore A, soft elastomers generally include those having a Durometer of about 60 Shore A to about 90 Shore A, and super-soft elastomers generally include those having a Durometer below about 60 Shore A. In certain embodiments, the integral outer skin 54 may have a Durometer of approximately between 20 to 60 Shore A. Such a configuration may facilitate bending of the integral outer skin 54, while maintaining durability and smoothness of the show surface 50. However, it should be appreciated that alternative embodiments may include an integral outer skin 54 having a Durometer of less than 20 Shore A or more than 60 Shore A.

As illustrated, an occupant finger 62 is depressing the tambour door 34 in the direction 64, thereby inducing the integral outer skin 54 to flex. As illustrated, where the finger 62 contacts the tambour door 34, the outer skin 54 has translated a distance 66 in the direction 64, thereby compressing the cushion 46. As a result, a curvature is induced within the integral outer skin 54. Because the integral outer skin 54 is flexible, the possibility of crack formation is substantially reduced or eliminated. Furthermore, because the cushion 46 is compressible, the tambour door 34 may be suitable for use as an armrest within the vehicle interior 12.

Figure 8:
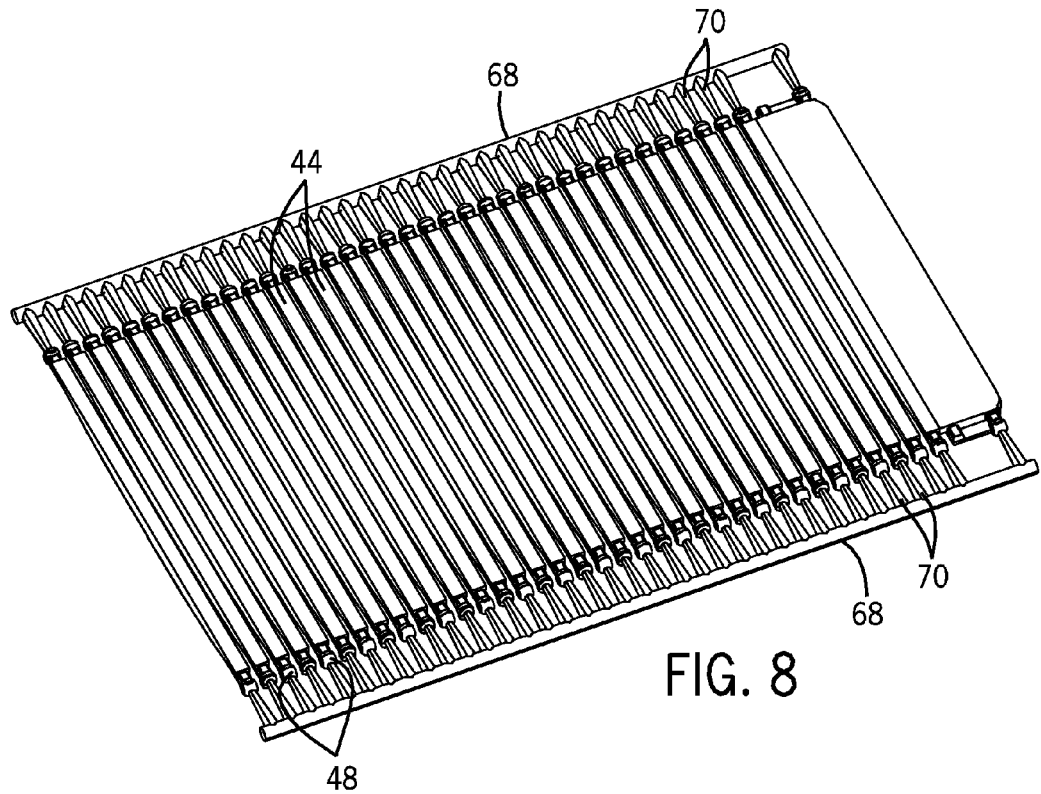
FIG. 8 is a perspective view of ribs formed by an injection molding process, including attached runners and connectors.

FIG. 8 is a perspective view of ribs 44 formed by an injection molding process, including attached runners and connectors. As previously discussed, injection molding involves injecting liquid resin into a mold to form a completed part. The mold includes cavities having a shape of the desired components. In certain embodiments, the mold includes a first half and a second half that are pressed together to establish the cavities. A pressurized liquid resin in then injected into the cavities via a series of flow paths or grooves. The completed part is formed as the liquid resin cures and hardens. However, residual resin remaining within the flow paths will cure and harden as well, leaving runners and connectors attached to the part.

The illustrated injection molded part includes two longitudinal runners 68 extending perpendicular to the ribs 44, and a series of connectors 70 extending between the runners 68 and the ribs 44. The runners 68 are formed by longitudinal flow paths configured to supply resin to each rib 44, while the connectors 70 are formed by flow paths extending between the longitudinal flow paths and the ribs 44. In the present embodiment, the runners 68 and connectors 70 serve to hold the ribs together after the injection molding process is complete. Specifically, the runners 68 and connectors 70 may maintain the spacing and orientation of the ribs 44 as the part is transferred from the first mold to a second mold for forming the cushion 46.

Figure 9:
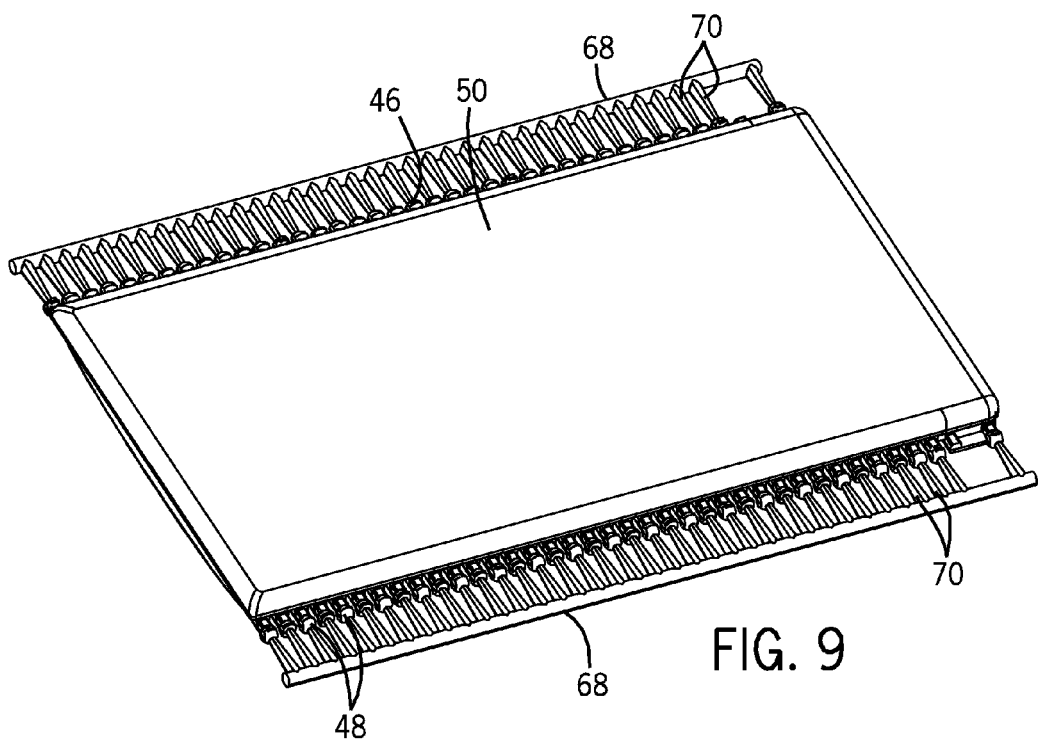
FIG. 9 is a perspective view of the ribs, as shown in FIG. 8, after the cushion has been formed by pouring foam into a mold.

FIG. 9 is a perspective view of the ribs 44, as shown in FIG. 8, after the cushion 46 has been formed by pouring foam into a mold. Once the part shown in FIG. 8 has been formed, the part may be transferred to a second mold for forming the cushion 46. In certain embodiments, the second mold may include a series of recesses configured to accept the ribs 44 formed by the injection molding process. In such embodiments, the recesses are aligned with a cavity having a shape of the desired cushion 46. A layer of paint is then applied to an inner surface of the mold, and two reactive compounds are mixed and poured into the mold, thereby forming the cushion 46. Due to the material chemistry as well as temperature variations within the mold, a high density flexible outer skin 54 will be formed around the low density foam cushion 46. Furthermore, the cushion 46 will bond to the ribs 44 as the foam cures. In addition, the paint will bond with the foam adjacent to the inner surface of the mold, thereby establishing a desired color of the flexible outer skin. Once the molding process is complete, the part may be removed from the mold, and the runners 68 and connectors 70 may be removed from the completed tambour door 34.

Figure 10:
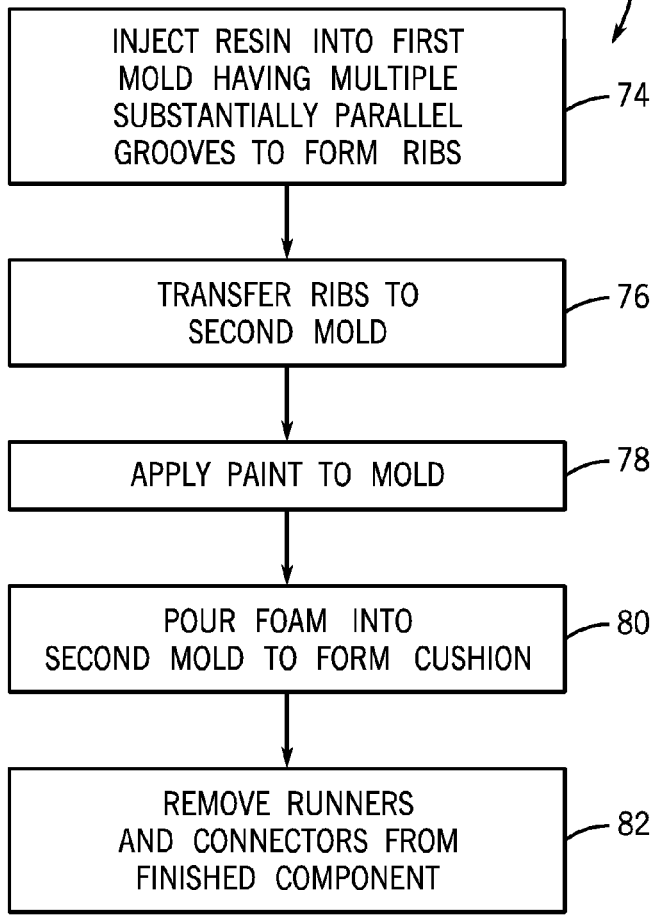
FIG. 10 is a process flow diagram of an exemplary process that may be utilized to form the flexible door.

FIG. 10 is a process flow diagram of an exemplary process 72 that may be utilized to form the flexible door 34. First, as represented by block 74, a resin is injected into a first mold having multiple substantially parallel grooves to form corresponding substantially parallel ribs 44. As previously discussed, the resin may be a thermoplastic polymer, such as polyamide, polycarbonate, or acrylonitrile butadiene styrene, for example. However, as will be appreciated, any suitable resin appropriate for injection molding may be utilized in alternative embodiments. The resin may be selected to form ribs 44 having sufficient bending resistance to support the door 34 during operation.

After the first resin has cured and/or hardened, the ribs 44 may be transferred to a second mold for forming the cushion, as represented by block 76. As previously discussed, the ribs 44 may include runners 68 and connectors 70 configured to hold the ribs 44 in the desired orientation and maintain the spacing between ribs 44. Consequently, the ribs 44 may be transferred from the first mold to the second mold as a single unit. The second mold may include recesses configured to accept the ribs 44, thereby aligning the ribs with a cavity that defines the shape of the cushion. Next, as represented by block 78, paint is applied to the second mold to establish a desired color of the flexible outer skin 54 and/or to provide a layer of ultraviolet protection for the cushion 46. As previously discussed, the paint may be disposed adjacent to an inner surface of the second mold such that the paint bonds with the portion of the poured foam that forms the outer skin 54. As a result, the outer skin 54 may achieve a desired base color. Foam may then be poured into the second mold to form the cushion, as represented by block 80. As previously discussed, two reactive compounds may be mixed and poured into the mold, thereby forming the cushion 46. In addition, due to the material chemistry as well as temperature variations within the mold, a high density flexible outer skin 54 will be formed around the low density foam cushion 46. Furthermore, the cushion 46 will bond to the ribs 44 as the foam cures. Once the molding process is complete, the tambour door 34 may be removed from the mold. Finally, as represented by block 82, the runners 68 and the connectors 70 are removed from the completed tambour door 34.

While the cushion 46 is bonded to the ribs 44 during the curing process in the present embodiment, it should be appreciated that other bonding techniques may be employed in alternative embodiments. For example, the cushion 46 may be molded separately from the ribs 44, and then attached to the ribs 44 by an adhesive connection. Furthermore, while a tambour door 34 is described above, it should be appreciated that alternative flexible interior trim components having an integral skin show surface may be utilized throughout the vehicle interior 12.

FIG. 11 is a detailed cross-sectional view of an alternative embodiment of a flexible door 34. As illustrated, an end 84 of the cushion 46 wraps around a protrusion 86 extending from a rib 44 positioned at a longitudinal end of the door 34. This configuration may enhance the appearance of the flexible door 34 and/or provide a stronger bond between the cushion 46 and the rib 44. As previously discussed, the foam bonds to the ribs 44 during the foam molding process. By increasing the contact area between the foam and a rib 44 at each longitudinal end of the door 34, a stronger bond will be formed, thereby enhancing the durability of the structure. In addition, the protrusion 86 includes multiple apertures 88 extending along the width of the door 34. As the foam expands during the molding process, the foam will enter the apertures 88, thereby providing a mechanical lock between the foam and the rib 44. This configuration may further enhance the bond between the cushion 46 and the ribs 44. While only one rib 44 includes a protrusion 86 having apertures 88 in the illustrated embodiment, it should be appreciated that further embodiments may include multiple protrusions configured to establish a mechanical lock between respective ribs and the foam cushion. In alternative embodiments, the ribs 44 may be encapsulated within the foam during the molding process. Such embodiments may also provide an enhanced bond between the ribs 44 and the foam cushion 46.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An interior trim component, comprising:
a plurality of substantially parallel ribs each configured to engage a track to facilitate movement of the interior trim component along the track; and
a cushion having an integral outer skin, wherein the cushion is coupled to the plurality of substantially parallel ribs, the cushion includes a first portion having a first density and a second portion having a second density, different than the first density, and the first portion and the second portion are formed from a single pourable foam;
wherein the first portion extends at least partially around the second portion, the first portion forms the integral outer skin of the cushion, and the first density is greater than the second density.

2. The interior trim component of claim 1, wherein a thickness of the cushion is configured to facilitate bending of the interior trim component in a direction substantially perpendicular to an orientation of the plurality of substantially parallel ribs.

3. The interior trim component of claim 1, wherein a thickness of the cushion is greater than approximately 5 mm.

4. The interior trim component of claim 1, wherein the integral outer skin has a hardness of greater than approximately 20 Shore A Durometer and less than approximately 60 Shore A Durometer.

5. The interior trim component of claim 1, wherein the interior trim component is configured to substantially enclose a storage compartment.

6. The interior trim component of claim 1, wherein the cushion is composed of a material having a softness of greater than approximately 24 pounds and less than approximately 36 pounds on a 25% indentation force deflection scale.

7. The interior trim component of claim 1, comprising a decorative layer disposed onto the integral outer skin.

8. The interior trim component of claim 7, comprising a top coat layer disposed onto the decorative layer and bonded to the integral outer skin, wherein the top coat layer is configured to flex with the integral outer skin while substantially maintaining continuity across the show surface.

9. An interior trim component, comprising:
a plurality of substantially parallel ribs; and
a cushion coupled to the plurality of substantially parallel ribs such that the interior trim component is capable of bending in a direction substantially perpendicular to an orientation of the plurality of substantially parallel ribs, wherein the cushion includes a first portion having a first density and a second portion having a second density, different than the first density, and the first portion and the second portion are formed from a single pourable foam;
wherein the first portion extends at least partially around the second portion, the first portion forms an integral outer skin of the cushion, and the first density is greater than the second density.

10. The interior trim component of claim 9, wherein the interior trim component comprises a tambour door configured to substantially enclose a storage compartment.

11. The interior trim component of claim 9, wherein the cushion is wrapped around a protrusion extending from a rib positioned at a longitudinal end of the interior trim component.

12. The interior trim component of claim 9, wherein at least one rib includes a protrusion having an aperture configured to mechanically lock the at least one rib to the cushion.

13. The interior trim component of claim 9, wherein each of the plurality of substantially parallel ribs is configured to engage a track to facilitate movement of the interior trim component along the track.

\* \* \* \* \*